United States Patent
Banno et al.

(10) Patent No.: US 6,660,797 B1
(45) Date of Patent: Dec. 9, 2003

(54) PROPYLENE RESIN COMPOSITION AND METHOD FOR MOLDING THE SAME

(75) Inventors: Yoshihiro Banno, Yokkaichi (JP);
Yoshihiro Sobajima, Yokkaichi (JP);
Akira Kobayashi, Yokkaichi (JP);
Masaaki Isoi, Yokkaichi (JP)

(73) Assignee: Japan Polychem Corporation, Tokyo (JP)

( * ) Notice: Subject to any disclaimer, the term of this patent is extended or adjusted under 35 U.S.C. 154(b) by 79 days.

(21) Appl. No.: 09/868,906

(22) PCT Filed: Nov. 10, 2000

(86) PCT No.: PCT/JP00/07932

§ 371 (c)(1),
(2), (4) Date: Oct. 10, 2001

(87) PCT Pub. No.: WO01/34701

PCT Pub. Date: May 17, 2001

(30) Foreign Application Priority Data

Nov. 11, 1999 (JP) .............................................. 11-320589
Jun. 8, 2000 (JP) ....................................... 2000-171449
Jun. 23, 2000 (JP) ....................................... 2000-189495

(51) Int. Cl.$^7$ ................................................. C08K 53/00
(52) U.S. Cl. ......................... 524/505; 524/451; 525/88; 525/95; 525/420; 293/120
(58) Field of Search ................................ 524/505, 451; 525/88, 95, 420; 293/120

(56) References Cited

U.S. PATENT DOCUMENTS

| | | | | |
|---|---|---|---|---|
| 5,460,768 A | * | 10/1995 | Akao et al. | ............... 264/297.2 |
| 5,596,042 A | * | 1/1997 | Itoh et al. | ....................... 525/98 |
| 5,829,804 A | * | 11/1998 | Saeki et al. | .................. 293/120 |
| 6,034,177 A | * | 3/2000 | Sobajima et al. | .............. 525/88 |

FOREIGN PATENT DOCUMENTS

| | | |
|---|---|---|
| EP | 496 625 | 7/1992 |
| EP | 519 725 | 12/1992 |
| JP | 57-008235 | 1/1982 |
| JP | 57-073034 | 5/1982 |
| JP | 08 183 412 | * 7/1996 |
| JP | 10-292072 | 11/1998 |
| JP | 11-207772 | 8/1999 |

* cited by examiner

*Primary Examiner*—David W. Wu
*Assistant Examiner*—Henry S Hu
(74) *Attorney, Agent, or Firm*—Armstrong, Westerman & Hattori, LLP

(57) ABSTRACT

This invention provides a propylene-based composition for the molded polypropylene resin articles excellent in resistance to scratching and moldability, and well-balanced properties between high rigidity and high impact strength, and also provides a method for molding the above propylene-based composition, thereby providing high-performance industrial parts and automobile parts, in particular automobile interior parts.

10 Claims, No Drawings

PROPYLENE RESIN COMPOSITION AND METHOD FOR MOLDING THE SAME

FIELD OF THE INVENTION

This invention relates to a propylene-based resin composition and to a molding method using the same, more particularly to a propylene-based resin composition high in rigidity and resistance to impact, excellent in resistance to scratching, and also excellent in moldability (injection moldability or press injection moldability), and to a molding method using the same.

BACKGROUND OF THE INVENTION

Recently, propylene-based composite materials comprising a propylene-based resin material incorporated with an inorganic filler (e.g., talc) and/or elastomer have been widely used for automobile parts, e.g., bumpers, instrument panels, door trims and pillar trims, because of their well-balanced properties and excellent moldability.

The propylene-based resin material is frequently incorporated with an elastomer, when it is to be used for automobile parts required to have high impact-related characteristics. However, increasing the elastomer content tends to cause loss of bending modulus of elasticity and bending strength. A filler, e.g., talc, has been incorporated in an attempt to improve these properties, but has failed to significantly improve bending strength, although successfully improving bending modulus of elasticity. Therefore, the conventional propylene-based composite material, although exhibiting a high bending modulus of elasticity, is not well-balanced with respect to impact resistance and bending strength.

Many automobile interiors are those which a person directly comes into contact with, and their feel of material, i.e., feel of rigidity, firmness or the like, depends on their bending strength. Therefore, a propylene-based composite material is required to be well-balanced with respect to impact resistance and bending strength.

For improvement of resistance of propylene-based resin composition to scratching, various techniques have been proposed; e.g., incorporation of a specific polyethylene (Japanese Patent Laid-Open No.73034/1982), use of a filler of specific particle size (Japanese Patent Laid-Open No.8235/1982), and addition of a nucleating agent or the like to improve crystallinity and hence surface hardness.

These techniques achieve the above objects to some extent. However, the propylene-based resin composition is required to have still higher resistance to scratching, as embossed patterns on the molded articles are becoming more diversified.

It is an object of the present invention to provide a propylene-based resin composition which gives the molded articles excellent in resistance to scratching, and, at the same time, in moldability (injection moldability or press injection moldability) and balanced properties (high rigidity and impact strength), to solve the above problems. It is another object of the present invention to provide a method for molding the above propylene-based resin composition, to produce high-performance industrial parts and automobile parts, in particular automobile interiors, at low cost.

DISCLOSURE OF THE INVENTION

The inventors of the present invention have found, after having extensively studied to solve the above problems, that the resin composition solving the above problems can be obtained by incorporating a specific propylene-based resin composition of high impact resistance with a specific high-crystallinity propylene resin material and inorganic filler or, depending on circumstances, pigment-containing resin material; or, depending on circumstances, by incorporating the above specific propylene-based resin composition of high impact resistance and/or high-crystallinity propylene resin material and specific inorganic filler with a specific ethylene/α-olefin copolymer rubber and/or specific polyethylene and/or fatty acid amide or its derivative, and by mixing or melting/kneading these components, reaching the present invention.

The first invention provides a propylene-based resin composition produced by mixing and/or melting/kneading the following components (A) and (B):

(A) Propylene-based resin composed of the following components (a1), (a2) and (a3); 90 to 40 wt. %
   (a1) Propylene/ethylene block copolymer, composed of 60 to 83 wt. % of crystalline propylene homopolymer component (a1-1 unit) and 17 to 40 wt. % of ethylene/propylene random copolymer component (a1-2 unit) containing 30 to 52 wt. % of ethylene and having a weight-average molecular weight of 230,000 to 600,000; and having a melt flow rate (230° C., load: 2.16 kg) of 15 to 150 g/10 min. and number of gels of 100 or less for those having a size of 50 μm or more in the molded article of 25 cm² (area) and 0.5 mm (thickness); 100 wt. parts.
   (a2) Talc having an average particle size of 0.5 to 15 μm; 0 to 200 wt. parts.
   (a3) Ethylene/α-olefin copolymer rubber, containing 20 to 50 wt. % of α-olefin of 3 to 8 carbon atoms and having a melt flow rate (230° C., load: 2.16 kg) of 0.3 to 100 g/10 min; 0 to 20 wt. parts.

(B) Propylene-based resin material composed of the following components (b1) and (b2); 10 to 60 wt. %:
   (b1) Propylene homopolymer or propylene/ethylene block copolymer, having a component insoluble in orthodichlorobenzene at below 120° C. accounting for 8 wt. % or more of the component insoluble at below 100° C., when fractionated with orthodichlorobenzene as the solvent, wherein the component insoluble at below 100° C. has a weight-average molecular weight of 200,000 or more and melt flow rate (230° C., load: 2.16 kg) of 0.3 to 70 g/10 min; 15 to 80 wt. parts.
   (b2) Talc or wollastonite having an average particle size of 0.5 to 15 μm; 20 to 85 wt. parts.

The second invention provides a propylene-based resin composition produced by mixing and/or melting/kneading the following components (A) and (B):

(A) Propylene-based resin material composed of the following components (a1), (a2) and (a3): 90 to 40 wt. %
   (a1) Propylene/ethylene block copolymer, composed of 60 to 83 wt. % of crystalline propylene homopolymer component (a1-1 unit) and 17 to 40 wt. % of ethylene/propylene random copolymer component (a1-2 unit) containing 30 to 52 wt. % of ethylene and having a weight-average molecular weight of 230,000 to 600,000; and having a melt flow rate (230° C., load: 2.16 kg) of 20 to 150 g/10 min. and number of gels of 100 or less for those having a size of 50 μm or more in the molded article of 25 cm² (area) and 0.5 mm (thickness); 100 wt. parts.
   (a2) Talc having an average particle size of 0.5 to 15 μm; 0 to 200 wt. parts.

(a3) Ethylene/α-olefin copolymer rubber containing 20 to 50 wt. % of α-olefin of 3 to 8 carbon atoms and having a melt flow rate (230° C., load: 2.16 kg) of 0.3 to 15 g/10 min; 0 to 10 wt. parts.

(B) Propylene-based resin material composed of the following components (b1) and (b2); 10 to 60 wt. %:

(b1) Homopolypropylene or propylene/ethylene block copolymer, having a component insoluble in orthodichlorobenzene at below 120° C. accounting for 10 wt. % or more of the component insoluble at below 100° C., when fractionated with orthodichlorobenzene as the solvent, wherein the component insoluble at below 100° C. has a weight-average molecular weight of 200,000 or more and melt flow rate (230° C., load: 2.16 kg) of 0.3 to 20 g/10 min; 100 wt. parts.

(b2) Talc having an average particle size of 0.5 to 15 μm; 0 to 200 wt. parts.

The third invention provides a propylene-based resin composition, composed of 100 wt. parts of the totaled components (A) and (B) for the first invention incorporated with 10 wt. parts or less of the following component (C), and produced by mixing and/or melting/kneading these components:

(C) Propylene-based colorant material, composed of the following components (c1), (c3), (c4), (c5) and (c6):

(c1) Propylene homopolymer, propylene/ethylene block copolymer, propylene/ethylene random copolymer, polyethylene or ethylene-based rubber, having a melt flow rate (230° C., load: 2.16 kg) of 0.3 to 200 g/10 min.; 20 to 99.9 wt. %.

(c3) Ethylene/α-olefin copolymer rubber containing 20 to 50 wt. % of α-olefin of 3 to 8 carbon atoms and having a melt flow rate (230° C., load: 2.16 kg) of 0.3 to 100 g/10 min; 0 to 90 wt. %.

(c4) Polyethylene having a density of 0.920 g/cm$^3$ or more and melt flow rate (190° C., load: 2.16 kg) of 1 to 100 g/10 min; 0 to 90 wt. %.

(c5) Fatty acid amide or its derivative; 0 to 30 wt. %.

(c6) Pigment; 0.1 to 80 wt. %.

The fourth invention provides a propylene-based resin composition, composed of 100 wt. parts of the component (a1) for the component (A) for the first or third invention incorporated with 20 wt. parts or less of the following component (a4):

(a4) Polyethylene having a density of 0.920 g/cm$^3$ or more and melt flow rate (190° C., load: 2.16 kg) of 1 to 100 g/10 min.

The fifth invention provides a propylene-based resin composition, composed of 100 wt. parts of the totaled components (b1) and (b2) for the component (B) for the first, third or fourth invention incorporated with 30 wt. parts or less of the following component (b3):

(b3) Ethylene/α-olefin copolymer rubber containing 20 to 50 wt. % of α-olefin of 3 to 8 carbon atoms and having a melt flow rate (230° C., load: 2.16 kg) of 0.3 to 100 g/10 min.

The sixth invention provides a propylene-based resin composition, composed of 100 wt. parts of the totaled components (b1) and (b2) for the component (B) for the first, or one of third to fifth invention incorporated with 30 wt. parts or less of the following component (b4):

(b4) Polyethylene having a density of 0.920 g/cm$^3$ or more and melt flow rate (190° C., load: 2.16 kg) of 1 to 100 g/10 min.

The seventh invention provides a propylene-based resin composition, composed of 100 wt. parts of the totaled components (b1) and (b2) for the component (B) for the first, or one of third to sixth invention incorporated with 0.1 to 9 wt. parts of a fatty acid amide or its derivative.

The eighth invention provides a propylene-based resin composition, composed of 100 wt. parts of the totaled components (b1) and (b2) for the component (B) for the first, or one of third to seventh invention incorporated with 0.1 to 5 wt. parts of a higher fatty acid or its metallic salt.

The ninth invention provides a method for molding the propylene-based resin composition of one of the first to eight inventions by injection molding or press injection molding.

The tenth invention provides an automobile part produced by the method of the ninth invention.

PREFERRED EMBODIMENTS OF THE PRESENT INVENTION

The present invention is described in more detail.

The propylene-based resin composition of the present invention is composed of the following components (A) and (B), and produced by mixing and/or kneading/granulation.

[I] Propylene-based Resin Composition of the Present Invention (First Invention)

(1) Component (A)

The component (A) for the present invention is the propylene-based resin material composed of the following components (a1), (a2) and (a3):

(i) Component (a1)

The component (a1) is the major component for the propylene-based resin material as the component (A). It is a propylene/ethylene block copolymer, composed of crystalline propylene homopolymer component (a1-1 unit) and ethylene/propylene random copolymer component (a1-2 unit).

The a1-2 unit contains ethylene at 30 to 52 wt. %, preferably 32 to 50 wt. %, more preferably 35 to 45 wt. %. The ethylene content beyond the above range may deteriorate impact strength of the propylene-based resin composition.

The a1-2 unit has a weight-average molecular weight of 230,000 to 600,000, preferably 250,000 to 500,000, more preferably 300,000 to 400,000. The molecular weight below the above range is undesirable, because it may deteriorate impact strength of the propylene-based resin composition, and that beyond the above range is also undesirable, because it may deteriorate outer appearances of the molded article. Contents of the a1-1 and a1-2 units of the propylene/ethylene block copolymer are 60 to 83 wt. %, preferably 65 to 80 wt. %, more preferably 70 to 77 wt. % for the former, and 17 to 40 wt. %, preferably 20 to 35 wt. %, more preferably 23 to 30 wt. % for the latter. An a1-1 unit content exceeding the above range coupled with an a1-2 unit content below the above range is undesirable, because it may deteriorate bending strength of the propylene-based resin material. On the other hand, an a1-1 unit content below the above range coupled with an a1-2 unit content exceeding the above range is also undesirable, because it may deteriorate impact strength.

The propylene/ethylene block copolymer as the component (a1) has a melt flow rate (230° C., load: 2.16 kg, hereinafter referred to as MFR) of 15 to 150, preferably 20 to 150, more preferably 20 to 110, still more preferably 20 to 70 g/10 min. MFR beyond the above range is undesirable, because it may deteriorate outer appearances of the molded article when it is below the above range and deteriorate impact strength of the propylene-based resin composition when it exceeds the above range.

The propylene/ethylene block copolymer as the component (a1) has a number of gels of 100 or less, preferably 60 or less, more preferably 40 or less, for those having a size of 50 μm or less in the molded article of 25 cm² (area) and 0.5 mm (thickness). The number exceeding 100 is undesirable, because it may deteriorate outer appearances of the molded article and impact strength of the propylene-based resin composition.

The propylene/ethylene block copolymer having the above-described specific properties may be produced by polymerization (slurry, vapor-phase or block polymerization) in the presence of a catalyst of high stereoregularity, e.g., Ziegler or metallocene type catalyst. The polymerization may be effected either batchwise or continuous process. For production of the propylene/ethylene block copolymer, it is preferable, viewed from improved quality, to produce the crystalline propylene homopolymer component (a1-1 unit) first by homopolymerization of propylene, and then the ethylene/propylene random copolymer component (a1-2 unit) by random copolymerization of ethylene and propylene.

More concretely, the homopolymerization is effected in the presence of a catalyst, comprising a solid component prepared by bringing titanium tetrachloride and a halide of organic acid into contact with magnesium chloride, and combined with an organic aluminum or silicon compound, and then followed by the random copolymerization of ethylene and propylene.

The propylene/ethylene block copolymer may be incorporated further with another unsaturated compound, e.g., α-olefin such as 1-butene, or vinyl ester such as vinyl acetate, to form the copolymer of 3 or more components or the mixture thereof, so long as the effect of the present invention is not notably damaged. It may be in the mold of pellet or powder.

(ii) Component (a2)

The component (a2) for the present invention is talc. Talc for the present invention preferably has an average particle size of 0.5 to 15 μm, more preferably 2 to 10 μm.

The talc having an average particle size in the above range can decrease expansion coefficient of the propylene-based resin composition, and brings other advantages, e.g., reduced shrinkage and outer appearances of good, controlled gloss. The average particle size can be determined by a laser-aided diffraction/scattering particle size distribution analyzer (e.g., HORIBA's LA-920).

The talc can be obtained by finely crushing naturally occurring one by a mechanical means, and classifying the particles precisely. The crushed particles may be classified first roughly and then more precisely. The mechanical means include crushers, e.g., jaw, hammer, roll and jet crushers, and mills, e.g., screen, colloid, roll and vibration mills. The crushed talc particles are classified by the wet or dry method once or repeatedly to have a desirable average size for the present invention. The useful devices for classifying them include cyclone, cyclone air separator, micro separator, and sharp-cut separator. It is preferable to crush the talc to have a size in a specific range, and classify the crushed particles by a sharp-cut separator, to prepare the talc for the present invention.

The talc particles for the present invention may be as-received or surface-treated beforehand physically or chemically with an agent selected from various ones, e.g., silane coupling agent, higher fatty acid, metallic salt of fatty acid, unsaturated organic acid, organotitanate, resin acid and polyethylene glycol. Use of the surface-treated talc gives the propylene-based resin composition of further improved properties, e.g., moldability and impact strength.

(iii) Component (a3)

The present invention may be further incorporated with, in addition to the components (a1) and (a2), an ethylene/α-olefin copolymer rubber as the component (a3) which contains an α-olefin of 3 to 8 carbon atoms. Such α-olefins include propylene, 1-butene, 1-pentene, 1-hexene, 1-octene, and 4-methyl-penetene-1.

The α-olefin content is 20 to 50 wt. % on the whole ethylene/α-olefin copolymer rubber, preferably 20 to 45 wt. %, more preferably 20 to 40 wt. %. The α-olefin content beyond the above range is undesirable, because it may deteriorate impact strength when it is below the above range and deteriorate rigidity when it exceeds the above range.

The ethylene/α-olefin copolymer rubber as the component (a3) has an MFR (230° C., load: 2.16 kg) of 0.3 to 100, preferably 0.7 to 70, more preferably 1 to 30 g/10 min. The MFR beyond the above range is undesirable, because it may deteriorate moldability when it is below the above range and cause insufficient impact strength and surface hardness when it exceeds the above range.

(iv) Contents of the Components (a1) to (a3)

Content of the component (a2) in the component (A) is 0 to 200 wt. parts per 100 wt. parts of the component (a1), preferably 0 to 100 wt. parts, more preferably 0 to 60 wt. parts, still more preferably 0 to 40 wt. parts. The component (a2) is not an essential but an optional component, and may not be incorporated in the component (A). Nevertheless, however, incorporation of the component (a2) can decrease expansion coefficient of the propylene-based resin composition, and brings other advantages, e.g., reduced shrinkage and outer appearances of good, controlled gloss. However, the content exceeding 200 wt. parts per 100 wt. parts of the component (a1) is undesirable, because it may cause insufficient dispersion of the talc.

Content of the component (a3) in the component (A) is 0 to 20 wt. parts per 100 wt. parts of the component (a1), preferably 0 to 10 wt. parts, more preferably 2 to 9 wt. parts, still more preferably 2 to 6 wt. parts. The component (a3) is not an essential but an optional component, and may not be incorporated in the component (A). Nevertheless, however, incorporation of the component (a3) can bring an advantage of improved impact strength. However, the content exceeding 20 wt. parts per 100 wt. parts of the component (a1) is undesirable, because it may cause insufficient bending strength.

(v) Production of the Component (A)

The component (A) is obtained by mixing the above components (a1) to (a3) with each other. The mixing method is not limited, and the components (a1) to (a3) in a specific ratio are mixed by a known machine, e.g., Henschel mixer, tumbler and ribbon blender.

It is preferable that the mixing for production of the component (A) is followed by melting and kneading, and, depending on circumstances, further by granulation to mold the component into pellets. The kneading and granulation can be effected by the conventional kneader, e.g., extruder (e.g., of monoaxial or biaxial type), Banbury mixer, roll, Brabender Plastograph, or another kneader, set at 100 to 240° C. Of these, an extruder, in particular biaxial extruder, is more preferable. In the above process, the components may be mixed and kneaded altogether or separately, e.g., part of the component (a1) is kneaded with the component (a3) or (a2), and the remainder is then kneaded with the mixture, to be granulated.

(2) Component (B)

The component (B) for the present invention is the propylene-based resin material composed of the following components (b1) and (b2):

(i) Component (b1)

The component (b1) for the present invention is a propylene homopolymer or propylene/ethylene block copolymer, having a component insoluble in orthodichlorobenzene at below 120° C. accounting for 8 wt. % or more of the component insoluble at below 100° C., when fractionated with orthodichlorobenzene as the solvent. More concretely, when the component (b1) is dissolved in orthodichlorobenzene as the solvent, its component insoluble in the solvent heated at 100° C. is referred to as the one "insoluble at 100° C.", and the component insoluble in the solvent heated at 120° C. is referred to as the one "insoluble at 120° C". The component insoluble at 120° C. accounts for 8 wt. % or more of the whole component insoluble at 100° C., preferably 10 wt. % or more, more preferably 12 wt. % or more, still more preferably 15 wt. % or more. The component insoluble at 120° C. accounting for less than 8 wt % is undesirable, because it may cause insufficient bending strength and bending modulus of elasticity.

For the component (b1) for the present invention, the component insoluble at 100° C. has a weight-average molecular weight (Mw) of 200,000 or more, preferably 250,000 or more. The molecular weight below the above range is undesirable, because it may deteriorate impact strength of the component (b1).

The component (b1) for the present invention has an MFR of 0.3 to 70, preferably 0.5 to 50, more preferably 1 to 40 g/10 min. MFR beyond the above range is undesirable, because it may deteriorate outer appearances of the molded article when it is below the above range and cause insufficient impact strength of the propylene-based resin composition when it exceeds the above range.

The component (b1) may be a propylene homopolymer or propylene/ethylene block copolymer. When it is a propylene/ethylene block copolymer, it contains ethylene preferably at 1 to 15 wt. %, more preferably 1 to 10 wt. %, still more preferably 2 to 8 wt. % or so.

The propylene homopolymer or propylene/ethylene block copolymer having the above-described specific properties may be produced in the same manner as that for the above-described component (a1-1) or (a1).

(ii) Component (b2)

The component (B) for the present invention contains, in addition to the above-described component (b1), talc or wollastonite as the component (b2), having an average particle size of 0.5 to 15 μm, more preferably 2 to 10 μm.

The talc or wollastonite having an average particle size in the above range can decrease expansion coefficient of the propylene-based resin composition, and brings other advantages, e.g., reduced shrinkage and outer appearances of good, controlled gloss. The average particle size of talc or wollastonite can be determined by a laser-aided diffraction/scattering particle size distribution analyzer (e.g., HORIBA's LA-920).

The talc can be obtained by finely crushing naturally occurring one by a mechanical means, and classifying the particles precisely. The crushed particles may be classified first roughly and then more precisely. The mechanical means include crushers, e.g., jaw, hammer, roll and jet crushers, and mills, e.g., screen, colloid, roll and vibration mills. The crushed talc particles are classified by the wet or dry method once or repeatedly to have a desirable average size for the present invention. The useful devices for classifying them include cyclone, cyclone air separator, micro separator, and sharp-cut separator. It is preferable to crush the talc to have a size in a specific range, and classify the crushed particles by a sharp-cut separator, to prepare the talc for the present invention.

The talc particles for the present invention may be as-received or surface-treated beforehand physically or chemically with an agent selected from various ones, e.g., silane coupling agent, higher fatty acid, metallic salt of fatty acid, unsaturated organic acid, organotitanate, resin acid and polyethylene glycol. Use of the surface-treated talc gives the propylene-based resin composition of further improved properties, e.g., moldability and impact strength.

Wollastonite is represented by the chemical formula $CaSiO_3$ or $CaO.SiO_2$, and normally in the form of needles or indefinite particles.

The wollastonite for the present invention preferably has an aspect ratio of 2 or more.

(iii) Contents of the Components (b1) and (b2)

Content of the component (b2) is 20 to 85 wt. parts per 100 wt. parts of the totaled components (b1) and (b2), preferably 25 to 80 wt. parts. Content of the component (b2) beyond the above range is undesirable, because it may not sufficiently reduce expansion coefficient and cause outer appearances of insufficiently controlled gloss when it is below 20 wt. parts, and cause insufficient dispersion of the talc or wollastonite when it exceeds 85 wt. parts.

(iv) Production of the Component (B)

The component (B) is obtained by mixing the components (b1) and (b2) with each other. These components may be molten and kneaded, after being mixed with each other, and, depending on circumstances, further granulated into pellets. The mixing, melting/kneading and granulation methods may be the same as those for producing the component (A).

(3) Contents of the Components (A) and (B)

Contents of the components (A) and (B) for the propylene-based resin composition of the present invention are 90 to 40 wt. %, preferably 85 to 45 wt. %, more preferably 80 to 55 wt. % for the component (A), and 10 to 60 wt. %, preferably 15 to 55 wt. %, more preferably 20 to 45 wt. % for the component (B). A component (A) content below the above range coupled with a component (B) content exceeding the above range is undesirable, because it may deteriorate impact strength of the propylene-based resin composition. On the other hand, a component (A) content exceeding the above range coupled with a component (B) content below the above range is also undesirable, because it may deteriorate rigidity.

The above composition of the high-fluidity propylene-based resin (Component (A)) and resin composition (Component (B)), the former containing the rubber component at a high content and the latter containing the high-crystallinity propylene-based resin and inorganic filler, gives the molded resin articles of sufficiently high rigidity and improved bending strength for the present invention.

(4) Additional Components (Optional)

The propylene-based resin composition of the present invention may be incorporated with, in addition to the above components (A) and (B), one or more of additional components (optional components), so long as the effect of the present invention is not notably damaged.

These additional components (optional components) useful for the present invention include antioxidant, e.g., phenol-, phosphorus- and sulfur-based ones; weathering-inhibiting agent, e.g., hindered amine-, benzophenone- and benzotriazole-based ones; nucleating agent, e.g., organoaluminum and organophosphorus compounds; colorant, e.g., quinacridon, perylene, phthalocyanine, titanium oxide, carbon black, azo-based pigment, iron red and ultramarine blue; whiskers, e.g., those of fibrous potassium titanate, fibrous magnesium oxysulfate, fibrous aluminum borate and calcium carbonate; filler component, e.g., carbon fibers and glass fibers; high-molecular-weight component, e.g., high-density and low-density polyethylene; and other additives, e.g., ultraviolet absorber, antistatic agent, dispersant, neutralizer, foaming agent, copper inhibitor, lubricant and flame-retardant.

These additional components may be incorporated in at least one of the constituent components (a1) to (a3) or (b1) and (b2) for the respective components (A) or (B) before hand, or while these constituent components are mixed with each other and, as required, molten and kneaded to prepare the component (A) or (B), or while the components (A) and (B) are mixed and molten/kneaded to prepare the propylene-based resin composition.

[II] Propylene-based Resin Composition (Second Invention)

The propylene-based resin composition [II] of the present invention differs from the above-described propylene-based resin composition [I] in the following points, and the different points are described.

1. The propylene/ethylene block copolymer as the component (a1) has an MFR (230° C., load: 2.16 kg) of 20 to 150, preferably 20 to 110, more preferably 20 to 70 g/10 min. MFR beyond the above range is undesirable, because it may deteriorate outer appearances of the molded article when it is below the above range and deteriorate impact strength of the propylene-based resin composition when it exceeds the above range.

2. The ethylene/α-olefin copolymer rubber as the component (a3) has an MFR (230° C., load: 2.16 kg) of 0.3 to 15, preferably 0.7 to 13, more preferably 1 to 10 g/10 min. The MFR beyond the above range is undesirable, because it may deteriorate moldability when it is below the above range and cause insufficient impact strength and surface hardness when it exceeds the above range.

3. Content of the Component (a3)

Content of the component (a3) in the component (A) is 0 to 10 wt. parts per 100 wt. parts of the component (a1). The component (a3) is not an essential component, and may not be incorporated in the component (A). Nevertheless, however, incorporation of the component (a3) brings an advantage of improving impact strength. However, the content exceeding 10 wt. parts per 100 wt. parts of the component (a1) is undesirable, because it may cause insufficient bending strength. The preferable content pd the component (a3) is 2 to 6 wt. parts.

4. The component (b1) is a propylene homopolymer or propylene/ethylene block copolymer, having a component insoluble in orthodichlorobenzene at below 120° C. accounting for 10 wt. % or more of the component insoluble at below 100° C., when fractionated with orthodichlorobenzene as the solvent. More concretely, when the component (b1) is dissolved in orthodichlorobenzene as the solvent, its component insoluble in the solvent heated at 100° C. is referred to as the one "insoluble at 100° C.", and the component insoluble in the solvent heated at 120° C. is referred to as the one "insoluble at 120° C." The component insoluble at 120° C. accounts for 10 wt. % or more of the whole component insoluble at 100° C., preferably 13 wt. % or more, more preferably 15 wt. % or more. The component insoluble at 120° C. accounting for less than 10 wt. % is undesirable, because it may cause insufficient bending strength and bending modulus of elasticity.

5. The component (b1) for the present invention has an MFR of 0.3 to 20, preferably 0.5 to 15, more preferably 0.7 to 10 g/10 min. MFR beyond the above range is undesirable, because it may deteriorate outer appearances of the molded article when it is below the above range and cause insufficient impact strength of the propylene-based resin composition when it exceeds the above range.

6. The component (b2): Talc having an average particle size of preferably 0.5 to 15 μm, more preferably 2 to 10 μm, may be incorporated in addition to the component (b1). The talc having an average particle size in the above range can decrease expansion coefficient of the propylene-based resin composition, and brings other advantages, e.g., reduced shrinkage and outer appearances of good, controlled gloss.

7. Contents of the Components (b1) and (b2)

Content of the component (b2) is 0 to 200 wt. parts per 100 wt. parts of the component (b1), preferably 0 to 100, more preferably 0 to 60 wt. parts, still more preferably 2 to 60 wt. parts. The component (b2) is not an essential but optional component, and may not be incorporated. However, it is preferable to incorporate it, more preferably at 20 wt. parts or more. Incorporation of the component (b2) can decrease expansion coefficient of the propylene-based resin composition, and brings other advantages, e.g., reduced shrinkage and outer appearances of good, controlled gloss. However, the content exceeding 200 wt. parts per 100 wt. parts of the component (b1) is undesirable, because it may cause insufficient dispersion of the talc.

As described above, the propylene-based resin composition [II] of the present invention gives the molded resin articles of excellent properties, e.g., sufficiently high rigidity and bending strength, by combining the high-fluidity propylene-based resin (Component (A)) with the high-molecular-weight, high-crystallinity propylene-based resin (Component (B)).

[III] Propylene-based Resin Composition (Third Invention)

The propylene-based resin composition [III] of the present invention is composed of 100 wt. parts of the totaled components (A) and (B) for the propylene-based resin composition [I] incorporated with 10 wt. parts or less, preferably 1 to 6 wt. parts, of the following Component (C), and produced by mixing and/or melting/kneading these components:

(1) Component (C)

The component (C) for the present invention is a colorant material composed of the following components (c1), (c3), (c4), (c5) and (c6):

(i) Component (c1)

The component (c1) has an MFR (230° C., load: 2.16 kg) of 0.3 to 200, preferably 0.5 to 100 g/10 min., and is selected from the group consisting of propylene homopolymer, propylene/ethylene block copolymer, propylene/ethylene random copolymer, polyethylene and ethylene-based rubber. The coloration may be insufficient at an MFR less than 0.3 g/10 min., and defective outer appearances, e.g., uneven coloration, may result at an MFR more than 200 g/10 min.

The component (c1) may be a propylene homopolymer, propylene/ethylene block copolymer, propylene/ethylene random copolymer, polyethylene or ethylene-based rubber, so long as it is a polyolefin-based resin or rubber capable of dispersing the components (c5) and (c6). The resin or rubber having these specific properties may be produced by the methods for producing the components (A) and (B), and other known methods.

(ii) Component (c3)

The component (c3) is the same as the component (a3) for the above-described component (A).

(iii) Component (c4)

The component (c4) for the present invention is a polyethylene having a density of 0.920 g/cm$^3$ or more, preferably 0.930 g/cm³ or more, and MFR (190° C., load: 2.16 kg) of 1 to 100, preferably 1 to 50 g/10 min. Rigidity will be insufficient at the density below 0.920 g/cm³. Moldability will be insufficient at the MFR below the above range, and so will be impact strength at the MFR exceeding the above range.

The polyethylene useful for the component (b4) includes low-density, straight-chain low-density, medium-density and high-density polyethylene, of which high-density polyethylene is more preferable.

(iv) Component (c5)

The component (c5) for the present invention is a fatty acid amide or its derivative.

The concrete examples of these compounds include lauric, stearic, oleic, behenic, erucic, hydroxystearic, N-stearylerucic, ethylene-bis-stearic, ethylene-bis-oleic, and hexamethylene-bis-stearic acid amide.

(v) Component (c6)

The component (c6) for the present invention is a pigment component. The pigments useful for the component (c6) include the inorganic ones, e.g., carbon black, titanium oxide, iron red and ultramarine blue; and organic ones, e.g., quinacridon, perylene, phthalocyanine, azo-based pigment, and anthraquinone-based pigment.

(vi) Contents of the Components (c1), (c3), (c4), (c5) and (c6)

Content of the component (c1) in the component (C) is 20 to 99.9 wt. %, based on the (c1)+(c3)+(c4)+(c5)+(c6), preferably 30 to 95 wt. %. Uneven coloration may result at a component (c1) content of less than 20 wt. %, and insufficient coloration may result at more than 99.9 wt. %.

Content of the component (c3) in the component (C) is 0 to 90 wt. %, based on the (c1)+(c3)+(c4)+(c5)+(c6), preferably 0 to 80 wt. %. Insufficient rigidity may result at a component (c3) content of more than 90 wt. %.

Content of the component (c4) in the component (C) is 0 to 90 wt. %, based on the (c1)+(c3)+(c4)+(c5)+(c6), preferably 0 to 80 wt. %. Insufficient rigidity may result at a component (c4) content of more than 90 wt. %.

Content of the component (c5) in the component (C) is 0 to 30 wt. %, based on the (c1)+(c3)+(c4)+(c5)+(c6), preferably 0 to 20 wt. %. Insufficient rigidity may result at a component (c5) content of more than 30 wt. %, and such a content is undesirable.

Content of the component (c6) in the component (C) is 0.1 to 80 wt. %, based on the (c1)+(c3)+(c4)+(c5)+(c6), preferably 5 to 70 wt. %. Insufficient coloration may result at a component (c6) content of less than 0.1 wt. %, and insufficient dispersion of the pigment may result at more than 80 wt. %. Hence, the content beyond the above range is undesirable.

(vii) Production of the Component (C)

The component (C) is obtained by mixing the components (c1), (c3), (c4), (c5) and (c6) in the above ratio. These components may be molten and kneaded, after being mixed with each other, and, depending on circumstances, further granulated into pellets. The mixing, melting/kneading and granulation methods may be the same as those for producing the component (A).

(2) Composition of the Component (C)

Content of the component (C) in the propylene-based resin composition [III] of the present invention is 0 to 10 wt. parts per 100 wt. parts of the totaled components (A) and (B), preferably 0 to 6 wt. parts. The content exceeding 10 wt. parts may deteriorate rigidity of the composition and is also uneconomical.

The propylene-based resin composition [III] of the present invention is well-balanced with respect to rigidity and impact-resistant characteristics, and also high in resistance to scratching by including the high-fluidity propylene-based resin (Component (A)) and resin composition (Component (B)), the former containing the rubber component at a high content and the latter containing the high-crystallinity propylene-based resin and inorganic filler. It can also exhibit, when incorporated with another type of additive, pigment or the like, the resistance to scratching and low gloss required for automobile internals, e.g., instrument panels.

(3) Additional Components (Optional)

The propylene-based resin composition [III] of the present invention may be incorporated with, in addition to the above components (A), (B) and (C), one or more of additional components (optional components), so long as the effect of the present invention is not notably damaged.

These additional components (optional components) useful for the present invention include antioxidant, e.g., phenol- and phosphorus-based ones; weathering-inhibiting agent, e.g., hindered amine-, benzophenone- and benzotriazole-based ones; nucleating agent, e.g., organoaluminum and organophosphorus compounds; whiskers, e.g., those of fibrous potassium titanate, fibrous magnesium oxysulfate, fibrous aluminum borate and calcium carbonate; filler component, e.g., carbon fibers and glass fibers; high-molecular-weight component, e.g., high-density and low-density polyethylene; and other additives, e.g., ultraviolet absorber, antistatic agent, dispersant, lubricant, neutralizer, foaming agent, copper inhibitor, and flame-retardant.

These additional components may be incorporated in at least one of the constituent components for the components (A), (B) and (C) before hand, or while these constituent components are mixed with each other and, as required, molten and kneaded to prepare the component (A), (B) or (C), or while the components (A), (B) and (C) are mixed and molten/kneaded to prepare the propylene-based resin composition.

[IV] Propylene-based Resin Composition (Fourth Invention)

The propylene-based resin composition [IV] of the present invention comprises the component (A) for the propylene-based resin composition [I] or [III] which is further incorporated with the following component (a4) at 20 wt. parts or less per 100 wt. parts of the component (a1), preferably 1 to 10 wt. parts, and produced by mixing and/or kneading/granulating these components.

Component (a4):

The component (a4) for the fourth invention is the same as the component (c4) for the component (C) for the propylene-based resin composition [III].

This component is incorporated to further improve resistance to scratching and impact strength of the propylene-based resin composition of the present invention.

[V] Propylene-based Resin Composition (Fifth Invention)

The propylene-based resin composition [V] of the present invention comprises the component (B) for the propylene-based resin composition [I], [III] or [IV] which is further incorporated with the following component (b3) at 30 wt. parts or less per 100 wt. parts of the totaled components (b1) and (b2), preferably 1 to 20 wt. parts, and produced by mixing and/or kneading/granulating these components.

Component (b3):

The component (b3) for the fifth invention is the same as the component (a3) for the component (A) for the propylene-based resin composition [I].

[VI] Propylene-based Resin Composition (Sixth Invention)

The propylene-based resin composition [VI] of the present invention comprises the component (B) for the propylene-based resin composition [I], [III], [IV] or [V] which is further incorporated with the following component (b4) at 30 wt. parts or less per 100 wt. parts of the totaled components (b1) and (b2), preferably 0.1 to 9 wt. parts, and produced by mixing and/or kneading/granulating these components.

Component (b4):

The component (b4) for the sixth invention is the same as the component (c4) for the component (C) for the propylene-based resin composition [III], or component (a4) for the component (A) for the propylene-based resin composition [IV].

This component is incorporated to further improve resistance to scratching and impact strength of the propylene-based resin composition of the present invention.

[VII] Propylene-based Resin Composition (Seventh Invention)

The propylene-based resin composition [VII] of the present invention comprises the component (B) for the propylene-based resin composition [I], [III], [IV], [V] or [VI] which is further incorporated with a fatty acid amide or its derivative at 0.1 to 9 wt. parts per 100 wt. parts of the totaled components (b1) and (b2), and produced by mixing and/or kneading/granulating these components.

The fatty acid amide or its derivative is selected from the compounds for the component (c5) for the component (C) for the propylene-based resin composition [III].

This component is incorporated to further improve resistance to scratching and impact strength of the propylene-based resin composition of the present invention.

[VIII] Propylene-based Resin Composition (Eighth Invention)

The propylene-based resin composition [VIII] of the present invention comprises the component (B) for the propylene-based resin composition [I], [III], [IV], [V], [VI] or [VII] which is further incorporated with a higher fatty acid or its metallic salt at 0.1 to 5 wt. parts per 100 wt. parts of the totaled components (b1) and (b2), and produced by mixing and/or kneading/granulating these components:

The higher fatty acids or its metallic salts include stearic acid, 12-hydroxystearic acid, and metallic salts, e.g., calcium stearate and magnesium stearate.

This component is incorporated to improve dispersion of talc and/or wollastonite in the propylene-based resin composition of the present invention.

[IX] Method of Molding the Propylene-based Resin Composition

The method of molding the propylene-based resin composition of the present invention is not limited, and a known method may be used for mixing the components (A) and (B); (A), (B) and (C); or these components further incorporated, as required, with the additional (optional) component. These components in a specific ratio are mixed by a known machine, e.g., Henschel mixer, tumbler and ribbon blender. The mixing process may be followed by melting/kneading and granulation to mold the components into pellets. The kneading and granulation can be effected by the conventional kneader, e.g., extruder (e.g., of monoaxial or biaxial type), Banbury mixer, roll, Brabender Plastograph, or another mixer, set at around 180 to 240° C. Of these, an extruder, in particular biaxial extruder, is more preferable. In the above process, the components may be mixed and kneaded altogether or separately, e.g., part of the component (A) is kneaded with the component (B) and optional component, when used, and the remainder is then mixed/kneaded with the mixture, to be granulated.

The components (A) and (B); (A), (B) and (C); or these components further incorporated, as required, with the optional component may be directly fed into a hopper or the like of an injection molder to be molded.

The preferable methods include mixing and melting/kneading the components (A) and (B) or (A), (B) and (C) kneaded and granulated beforehand into pellets; or the pelletized components (A) and (B) or (A), (B) and (C) are mixed and then directly fed into an injection molder. The particularly preferable method is mixing the components (A) and (B) or (A), (B) and (C) and directly feeding the into an injection molder.

The present invention gives the product of any inorganic filler content by changing the component (A)/component (B) mixing ratio.

The propylene-based composition of the present invention may be molded into various types of articles by a method selected from various known methods, including injection molding (including gas injection molding), press injection molding, extrusion, blow molding, calendering, inflation molding, and film-molding monoaxial and biaxial stretching. Of these, injection molding and press injection molding are more preferable.

PREFFERRED EMBODIMENT

The present invention is described more concretely by EXAMPLES, which by no means limit the present invention, and variations may be made without departing from the spirit and scope of the invention.

The measurement methods used for EXAMPLES for analyzing various properties are described below:

(1) MFR: MFR was determined at 230° C. and a load of 2.16 kg for the polypropylene-based resin and rubber component, and 190° and a load of 2.16 kg for the polyethylene-based resin, in accordance with JIS-K7210.

(2) Content of rubber component: The ethylene/propylene random copolymer component (a1-2 unit) of the propylene/ethylene block copolymer (component (a1)) was determined by immersing 2 g of the sample in 300 g of boiling xylene for 20 minutes for dissolution, cooling the resultant solution to room temperature, and filtering and drying the separated solid phase by a glass filter, to determine the solid phase weight, from which the a1-2 unit content was calculated backward. The ethylene content of the a1-2 unit was determined by infrared spectroscopy.

(3) Weight-average molecular weight (Mw): Determined by GPC.

(4) Number of gels: Number of gels having a size of 50 μm or more in the molded article of 25 cm$^2$ (area) and 0.5 mm (thickness) was determined by the following method. The molded article of the above dimensions was prepared by injection molding, and irradiated with light from the back side. The magnified photograph was produced by a stereoscopic microscope and image-processed, to count number of gels classified at an average diameter of 50 μm.
(5) Determination of the insolubles: The components insoluble at 100° C. and 120° C. were determined by the cross separation method with orthodichlorobenzene as the solvent.
Analyzer: MITSUBISHI CHEMICAL's CFC T150A
Column: SHOWA DENKO's, AD80M/S, 3 columns
Concentration: 40 mg/19 mL
Solvent: Orthodichlorobenzene
(6) Bending modulus of elasticity and bending strength: Determined at 23° C. in accordance with JIS K7171
(7) Izod impact strength: Determined at 23° C. in accordance with JIS K7110
(8) Rockwell strength: Determined in accordance with JIS K7202
(9) Moldability: An embossed leather plate, 35 by 10 by 0.2 cm in size, was prepared by injection molding under the conditions of clamping pressure: 170 tons and molding temperature: 210° C., and its moldability was evaluated by the following standards:
○: Good moldability
X: Surface sink or short shot observed
(10) Resistance to scratching: A scratching needle with an edge having a radius of 0.6 mm was pressed on a embossed leather plate at a load of 400 g and moved thereon at 8.2 mm/second to scratch the surface. Resistance of the sample to scratching was evaluated by the following standards, based on the scratch conditions.
◎: Scratched to an inconspicuous extent
○: Scratched to an almost inconspicuous extent
X: Scratched to a notable extent

EXAMPLES 1 TO 3, AND COMPARATIVE EXAMPLES 1 TO 4

(1) Production of the Component (A)
The following components (a1) and (a3), each containing an antioxidant, were mixed with each other for 2 minutes by a Henschel mixer, and kneaded/granulated at a set temperature of 200° C. by a biaxial kneader (KOBE STEEL's KCM50) into the pellets (i) and (ii) of the component (A):
Pellets (i)
Component (a1): Propylene/ethylene block copolymer, composed of 74 wt. % of a crystalline propylene homopolymer component (a1-1 unit) and 26 wt. % of an ethylene/propylene random copolymer component (a1-2 unit) containing 40 wt. % of ethylene and having a weight-average molecular weight of 366,000; and having an MFR (230° C., load: 2.16 kg) of 32 g/10 min. and number of gels of 28 for those having a size of 50 μm or more in the molded article of 25 cm² (area) and 0.5 mm (thickness); 100 wt. parts.
Component (a3): Ethylene/1-butene copolymer rubber, containing 32 wt. % of 1-butene and having an MFR (230° C., load: 2.16 kg) of 8 g/10 min; 4 wt. parts.
Pellets (ii)
Component (a1): Propylene/ethylene block copolymer, composed of 86 wt. % of a crystalline propylene homopolymer component (a1-1 unit) and 14 wt. % of an ethylene/propylene random copolymer component (a1-2 unit) containing 55 wt. % of ethylene and having a weight-average molecular weight of 403,000; and having an MFR (230° C., load: 2.16 kg) of 31 g/10 min. and number of gels of 5 for those having a size of 50 μm or more in the molded article of 25 cm² (area) and 0.5 mm (thickness); 100 wt. parts.
Component (a3): No component (a3) was used.
(2) Production of the Component (B)

The following components (b1) containing an antioxidant and (b2) were mixed with each other for 2 minutes by a Henschel mixer, and kneaded/granulated at a set temperature of 200° C. by a biaxial kneader (KOBE STEEL's KCM50) into the pellets (i) to (v) of the component (B):
Pellets (i):
Component (b1): Propylene/etbylene block copolymer, having a component insoluble in orthodichlorobenzene at below 120° C. accounting for 17.3 wt. % of the component insoluble at below 100° C., when fractionated with orthodichlorobenzene as the solvent, wherein the component insoluble at below 100° C. has a weight-average molecular weight of 270,000 and MFR (230° C., load: 2.16 kg) of 10 g/10 min; 100 wt. parts.
Component (b2): No component (b2) was used. Pellets (ii):
Component (b1): Propylene/ethylene block copolymer, having a component insoluble in orthodichlorobenzene at below 120° C. accounting for 7.4 wt. % of the component insoluble at below 100° C., when fractionated with orthodichlorobenzene as the solvent, wherein the component insoluble at below 100° C. has a weight-average molecular weight of 150,000 and MFR (230° C., load: 2.16 kg) of 30 g/10 min; 100 wt. parts.
Component (b2): No component (b2) was used.
Pellets (iii):
Component (b1): Propylene/ethylene block copolymer, having a component insoluble in orthodichlorobenzene at below 120° C. accounting for 23.5 wt. % of the component insoluble at below 100° C., when fractionated with orthodichlorobenzene as the solvent, wherein the component insoluble at below 100° C. has a weight-average molecular weight of 346,000 and MFR (230° C., load: 2.16 kg) of 3 g/10 min; 70 wt. parts.
Component (b2): Talc having an average particle size of 5.2 μm; 30 wt. Parts
Pellets (iv):
Component (b1): Propylene/ethylene block copolymer, having a component insoluble in orthodichlorobenzene at below 120° C. accounting for 7.4 wt. % of the component insoluble at below 100° C., when fractionated with orthodichlorobenzene as the solvent, wherein the component insoluble at below 100° C. has a weight-average molecular weight of 150,000 and MFR (230° C., load: 2.16 kg) of 30 g/10 min; 70 wt. parts.
Component (b2): Talc having an average particle size of 5.2 μm; 30 wt. Parts
Pellets (v):
Component (b1): Propylene/ethylene block copolymer, having a component insoluble in orthodichlorobenzene at below 120° C. accounting for 22.9 wt. % of the component insoluble at below 100° C., when fractionated with orthodichlorobenzene as the solvent, wherein the component insoluble at below 100° C. has a weight-average molecular weight of 412,000 and MFR (230° C., load: 2.16 kg) of 0.2 g/10 min; 70 wt. parts.
Component (b2): Talc having an average particle size of 5.2 μm; 30 wt. Parts
(3) Production of the Propylene-based Resin Compositions
The components (A) and (B), prepared above, were mixed with each other for 2 minutes by a Henschel mixer, to prepare the pellets of the propylene-based resin compositions. Their compositions are given in Tables 1 and 2.
(4) Preparation of the Test Pieces
Each type of the pellets was molded by an injection molder (clamping pressure: 170 tons, molding temperature: 210° C.) into a 35 by 10 by 0.2 cm plate, test piece for the 3-point bending test in accordance with JIS K-69210, and test piece for the Izod impact test. The test piece was analyzed to evaluate the bending strength, Izod impact strength or the like, and moldability of each propylene-based resin composition. The results are given in Table 3.

TABLE 1

| | | component (A) | | | | | | | |
|---|---|---|---|---|---|---|---|---|---|
| | | component (a1) | | | | | | component (a3) | Total |
| | Types | Ethylene content of the a1-1 unit (wt. %) | Content of the a1-2 unit (wt. %) | Molecular weight of the a1-2 unit (Mw) | MFR (g/10 min.) | Number of gels | Content (wt. parts) | MFR (g/10 min.) | Content (wt. parts) | content (wt. %) |
| EXAMPLE 1 | Pellets (i) | 40 | 26 | 366,000 | 32 | 28 | 100 | 8 | 4 | 70 |
| EXAMPLE 2 | Pellets (i) | 40 | 26 | 366,000 | 32 | 28 | 100 | 8 | 4 | 80 |
| EXAMPLE 3 | Pellets (i) | 40 | 26 | 366,000 | 32 | 28 | 100 | 8 | 4 | 70 |
| COMPARATIVE EXAMPLE 1 | Pellets (i) | 40 | 26 | 366,000 | 32 | 28 | 100 | 8 | 4 | 50 |
| COMPARATIVE EXAMPLE 2 | Pellets (i) | 40 | 26 | 366,000 | 32 | 28 | 100 | 8 | 4 | 70 |
| COMPARATIVE EXAMPLE 3 | Pellets (i) | 40 | 26 | 366,000 | 32 | 28 | 100 | 8 | 4 | 80 |
| COMPARATIVE EXAMPLE 4 | Pellets (i) | 55 | 14 | 403,000 | 31 | 5 | 100 | — | — | 80 |

TABLE 2

| | | component (B) | | | | | | |
|---|---|---|---|---|---|---|---|---|
| | | component (b1) | | | component (b2) | | | |
| | Types | Proportion of the component insoluble in orthodichlorobenzene at below 120° C. in the component insoluble at below 100° C. (wt. %) | Molecular weight of the component insoluble at below 100° C. (Mw) | MFR (g/10 min.) | Content (wt. parts) | Particle size (µm) | Content (wt. parts) | Total content (wt. %) |
| EXAMPLE 1 | Pellets (i) | 17.3 | 270,000 | 10 | 100 | — | 0 | 30 |
| EXAMPLE 2 | Pellets (iii) | 23.5 | 346,000 | 3 | 70 | 5.2 | 30 | 20 |
| EXAMPLE 3 | Pellets (iii) | 23.5 | 346,000 | 3 | 70 | 5.2 | 30 | 30 |
| COMPARATIVE EXAMPLE 1 | Pellets (ii) | 7.4 | 150,000 | 30 | 100 | — | 0 | 50 |
| COMPARATIVE EXAMPLE 2 | Pellets (iv) | 7.4 | 150,000 | 30 | 70 | 5.2 | 30 | 30 |
| COMPARATIVE EXAMPLE 3 | Pellets (v) | 22.9 | 412,000 | 0.2 | 70 | 5.2 | 30 | 20 |
| COMPARATIVE EXAMPLE 4 | Pellets (iii) | 23.5 | 346,000 | 3 | 70 | 5.2 | 30 | 20 |

TABLE 3

| | Proportion | | | | Evaluation results | | | |
|---|---|---|---|---|---|---|---|---|
| | Component (A) | | Component (A) | | Bending strength (MPa) | Bending modulus of elasticity (MPa) | Izod impact strength at 23° C. (KJ/m²) | Moldability evaluation results |
| | Types | Content (wt. %) | Types | Content (wt. %) | | | | |
| EXAMPLE 1 | Pellets (i) | 70 | Pellets (i) | 30 | 34.3 | 1340 | 21 | ○ |
| EXAMPLE 2 | Pellets (i) | 80 | Pellets (iii) | 20 | 34.5 | 1520 | 22 | ○ |
| EXAMPLE 3 | Pellets (i) | 70 | Pellets (iii) | 30 | 36.3 | 1700 | 24 | ○ |
| COMPARATIVE EXAMPLE 1 | Pellets (i) | 50 | Pellets (ii) | 50 | 31.6 | 1210 | 16 | ○ |
| COMPARATIVE EXAMPLE 2 | Pellets (i) | 70 | Pellets (iv) | 30 | 32.2 | 1570 | 18 | ○ |
| COMPARATIVE | Pellets (i) | 80 | Pellets (v) | 20 | 33 | 1350 | 29 | x |

TABLE 3-continued

| | Proportion | | | | Evaluation results | | |
|---|---|---|---|---|---|---|---|
| | Component (A) | | Component (A) | | Bending | Bending modulus of | Izod impact strength at | Moldability |
| | Types | Content (wt. %) | Types | Content (wt. %) | strength (MPa) | elasticity (MPa) | 23° C. (KJ/m$^2$) | evaluation results |
| EXAMPLE 3 COMPARATIVE EXAMPLE 4 | Pellets (ii) | 80 | Pellets (iii) | 20 | 40.2 | 1870 | 10 | ○ |

The propylene-based resin composition has good moldability for injection molding, when its components (A) and (B) satisfy the conditions of claim 2 (those prepared in EXAMPLES 1 to 3), and the injection-molded test pieces exhibit high and well-balanced bending strength, bending modulus of elasticity and Izod impact strength, as shown in Tables 1 to 3.

By contrast, the propylene-based resin composition prepared in COMPARATIVE EXAMPLE 1 is inferior to that prepared in EXAMPLE 1 in all of bending strength, bending modulus of elasticity and Izod impact strength, wherein the comparative composition fails to satisfy the conditions of claim 2, because its component (b1) for the component (B) has a lower proportion (7.4 wt. %) of the insoluble in orthodichlorobenzene at below 120° C. in the component insoluble at below 100° C., lower weight-average molecular weight of 150,000 for the component insoluble at below 100° C., and higher MFR (230° C., load: 2.16 kg) of 30 g/10 min.

The resin composition prepared in COMPARATIVE EXAMPLE 2 to contain talc shows insufficient properties and is inferior to that prepared in EXAMPLE 3 in all of bending strength, bending modulus of elasticity and Izod impact strength, wherein its component (b1) for the component (B) fails to satisfy the conditions of claim 2, as is the case with the composition prepared in COMPARATIVE EXAMPLE 1.

The resin composition prepared in COMPARATIVE EXAMPLE 3 is inferior to that prepared in EXAMPLE 2 in bending strength and bending modulus of elasticity, and gives the defective injection-molded article with surface sinks and short shots, wherein its component (b1) for the component (B) fails to satisfy the conditions of claim 2 with a lower MFR of 0.2 g/10 min.

The resin composition prepared in COMPARATIVE EXAMPLE 4 shows insufficient properties, much lower Izod impact strength than that prepared in EXAMPLE 2 and collapsed balance among bending strength, bending modulus of elasticity and Izod strength, wherein its component (a1) for the component (A) fails to satisfy the conditions of claim 2, because the ethylene/propylene random copolymer component (a1-2 unit) contains ethylene at high 55 wt. % and is contained in the component (a1) at low 14 wt. %.

EXAMPLES 4 TO 11, AND COMPARATIVE EXAMPLES 5 TO 9

(1) Production of the Component (A)

The following components (a1) and (a3) each containing an antioxidant, and, as required, component (a4) and erucic acid amide, were mixed with each other for 2 minutes by a Henschel mixer, and kneaded/granulated at a set temperature of 200° C. by a biaxial kneader (KOBE STEEL's KCM50) into the pellets (iii) and (v) of the component (A):

Pellets (iii)

Component (a1): Propylene/ethylene block copolymer, composed of 75 wt. % of a crystalline propylene homopolymer component (a1-1 unit) and 25 wt. % of an ethylene/propylene random copolymer component (a1-2 unit) containing 39 wt. % of ethylene and having a weight-average molecular weight of 364,000; and having an MFR (230° C., load: 2.16 kg) of 33 g/10 min. and number of gels of 25 for those having a size of 50 µm or more in the molded article of 25 cm$^2$ (area) and 0.5 mm (thickness); 100 wt. parts.

Component (a3): Ethylene/1-butene copolymer rubber, containing 32 wt. % of 1-butene and having an MFR (230° C., load: 2.16 kg) of 8 g/10 min; 4 wt. parts.

Pellets (iv)

Component (a1): Propylene/ethylene block copolymer, composed of 75 wt. % of a crystalline propylene homopolymer component (a1-1 unit) and 25 wt. % of an ethylene/propylene random copolymer component (a1-2 unit) containing 39 wt. % of ethylene and having a weight-average molecular weight of 364,000; and having an MFR (230° C., load: 2.16 kg) of 33 g/10 min. and number of gels of 25 for those having a size of 50 µm or more in the molded article of 25 cm$^2$ (area) and 0.5 mm (thickness); 100 wt. parts.

Component (a3): Ethylene/1-butene copolymer rubber, containing 32 wt. % of 1-butene and having an MFR (230° C., load: 2.16 kg) of 8 g/10 min; 4 wt. parts.

Component (a4): High-density polyethylene having a density of 0.960 g/cm$^3$ and MFR (230° C., load: 2.16 kg) of 7 g/10 min.; 5 wt. parts Erucic acid amide; 0.4 wt. Parts Pellets (v)

Component (a1): Propylene/ethylene block copolymer, composed of 86 wt. % of a crystalline propylene homopolymer component (a1-1 unit) and 14 wt. % of an ethylene/propylene random copolymer component (a1-2 unit) containing 55 wt. % of ethylene and having a weight-average molecular weight of 403,000; and having an MFR (230° C., load: 2.16 kg) of 31 g/10 min. and number of gels of 28 for those having a size of 50 µm or more in the molded article of 25 cm$^2$ (area) and 0.5 mm (thickness); 100 wt. parts.

Component (a3): Ethylene/1-butene copolymer rubber, containing 32 wt. % of 1-butene and having an MFR (230° C., load: 2.16 kg) of 8 g/10 min; 4 wt. parts.

(2) Production of the Component (B)

The following components (b1), (b2) and (b3), and optionally component (b4) or erucic acid were mixed with each other for 2 minutes by a Henschel mixer, and kneaded/granulated at a set temperature of 200° C. by a biaxial kneader (KOBE STEEL's KCM50) into the pellets (vi) to (xiv) of the component (B):

Pellets (vi):

Component (b1): Propylene/ethylene block copolymer, having a component insoluble in orthodichlorobenzene at below 120° C. accounting for 17.5 wt. % of the component insoluble at below 100° C., when fractionated with orthodichlorobenzene as the solvent, wherein the component insoluble at below 100° C. has a weight-average molecular weight of 268,000 and MFR (230° C., load: 2.16 kg) of 10 g/10 min; 34 wt. parts.

Component (b2): Talc having an average particle size of 4.8 μm; 60 wt. parts. Component (b3): Ethylene/1-butene copolymer rubber, containing 32 wt. % of 1-butene and having an MFR (230° C., load: 2.16 kg) of 12 g/10 min; 6 wt. parts.

Pellets (vii):

Component (b1): Propylene/ethylene block copolymer, having a component insoluble in orthodichlorobenzene at below 120° C. accounting for 23.7 wt. % of the component insoluble at below 100° C., when fractionated with orthodichlorobenzene as the solvent, wherein the component insoluble at below 100° C. has a weight-average molecular weight of 348,000 and MFR (230° C., load: 2.16 kg) of 3 g/10 min; 37 wt. parts.

Component (b2): Talc having an average particle size of 4.8 μm; 60 wt. parts.

Component (b3): Ethylene/1-butene copolymer rubber, containing 32 wt. % of 1-butene and having an MFR (230° C., load: 2.16 kg) of 12 g/10 min; 3 wt. parts.

Pellets (viii):

Component (b1): Propylene/ethylene block copolymer, having a component insoluble in orthodichlorobenzene at below 120° C. accounting for 23.7 wt. % of the component insoluble at below 100° C., when fractionated with orthodichlorobenzene as the solvent, wherein the component insoluble at below 100° C. has a weight-average molecular weight of 348,000 and MFR (230° C., load: 2.16 kg) of 3 g/10 min; 34 wt. parts.

Component (b2): Talc having an average particle size of 4.8 μm; 60 wt. parts. Component (b3): Ethylene/1-butene copolymer rubber, containing 32 wt. % of 1-butene and having an MFR (230° C., load: 2.16 kg) of 12 g/10 min; 6 wt. parts.

Pellets (ix):

Component (b1): Propylene/ethylene block copolymer, having a component insoluble in orthodichlorobenzene at below 120° C. accounting for 23.7 wt. % of the component insoluble at below 100° C., when fractionated with orthodichlorobenzene as the solvent, wherein the component insoluble at below 100° C. has a weight-average molecular weight of 348,000 and MFR (230° C., load: 2.16 kg) of 3 g/10 min; 27 wt. parts.

Component (b2): Talc having an average particle size of 4.8 μm; 60 wt. parts.

Component (b3): Ethylene/1-butene copolymer rubber, containing 32 wt. % of 1-butene and having an MFR (230° C., load: 2.16 kg) of 12 g/10 min; 6 wt. parts.

Component (a4): High-density polyethylene having a density of 0.960 g/cm³ and MFR (190° C., load: 2.16 kg) of 7 g/10 min.; 7 wt. parts Erucic acid amide; 0.7 wt. Parts Pellets (x):

Component (b1): Propylene/ethylene block copolymer, having a component insoluble in orthodichlorobenzene at below 120° C. accounting for 23.7 wt. % of the component insoluble at below 100° C., when fractionated with orthodichlorobenzene as the solvent, wherein the component insoluble at below 100° C. has a weight-average molecular weight of 348,000 and MFR (230° C., load: 2.16 kg) of 3 g/10 min; 24 wt. parts.

Component (b2): Talc having an average particle size of 4.8 μm; 70 wt. parts. Component (b3): Ethylene/1-butene copolymer rubber, containing 32 wt. % of 1-butene and having an MFR (230° C., load: 2.16 kg) of 12 g/10 min; 6 wt. parts.

Pellets (xi):

Component (b1): Propylene/ethylene block copolymer, having a component insoluble in orthodichlorobenzene at below 120° C. accounting for 23.7 wt. %o of the component insoluble at below 100° C., when fractionated with orthodichlorobenzene as the solvent, wherein the component insoluble at below 100° C. has a weight-average molecular weight of 348,000 and MFR (230° C., load: 2.16 kg) of 3 g/10 min; 39 wt. parts.

Component (b2): Talc having an average particle size of 4.8 μm; 60 wt. parts. Component (b3): Ethylene/1-butene copolymer rubber, containing 32 wt. % of 1-butene and having an MFR (230° C., load: 2.16 kg) of 12 g/10 min; 1 wt. parts.

Pellets (xii):

Component (b1): Propylene/ethylene block copolymer, having a component insoluble in orthodichlorobenzene at below 120° C. accounting for 7.4 wt. % of the component insoluble at below 100° C., when fractionated with orthodichlorobenzene as the solvent, wherein the component insoluble at below 100° C. has a weight-average molecular weight of 140,000 and MFR (230° C., load: 2.16 kg) of 50 g/10 min; 34 wt. parts.

Component (b2): Talc having an average particle size of 4.8 μm; 60 wt. parts.

Component (b3): Ethylene/1-butene copolymer rubber, containing 32 wt. % of 1-butene and having an MFR (230° C., load: 2.16 kg) of 12 g/10 min; 6 wt. parts.

Pellets (xiii):

Component (b1): Propylene/ethylene block copolymer, having a component insoluble in orthodichlorobenzene at below 120° C. accounting for 22.9 wt. % of the component insoluble at below 100° C., when fractionated with orthodichlorobenzene as the solvent, wherein the component insoluble at below 100° C. has a weight-average molecular weight of 412,000 and MFR (230° C., load: 2.16 kg) of 0.2 g/10 min; 34 wt. parts.

Component (b2): Talc having an average particle size of 4.8 μm; 60 wt. parts.

Component (b3): Ethylene/1-butene copolymer rubber, containing 32 wt. % of 1-butene and having an MFR (230° C., load: 2.16 kg) of 12 g/10 min; 6 wt. parts.

Pellets (xiv):

Component (b1): Propylene/ethylene block copolymer, having a component insoluble in orthodichlorobenzene at below 120° C. accounting for 23.7 wt. % of the component insoluble at below 100° C., when fractionated with orthodichlorobenzene as the solvent, wherein the component insoluble at below 100° C. has a weight-average molecular weight of 348,000 and MFR (230° C., load: 2.16 kg) of 3 g/10 min; 15 wt. parts.

Component (b2): Talc having an average particle size of 4.8 μm; 60 wt. parts.

Component (b3): Ethylene/1-butene copolymer rubber, containing 32 wt. % of 1-butene and having an MFR (230° C., load: 2.16 kg) of 12 g/10 min; 25 wt. parts.

(3) Production of the Component (C)

The following components (c1), (c5) and (c6) were mixed with each other for 2 minutes by a Henschel mixer, and kneaded/granulated at a set temperature of 200° C. by a biaxial kneader (KOBE STEEL's KCM50) into the pellets (i) of the component (C):

Pellets (i):

Component (c1): Low-density polyethylene having an MFR of 40 g/10 min.; 70 wt. %

Component (c5): Erucic acid amide; 10 wt. %

Component (c6): Pigment containing carbon black and titanium oxide as the major ingredients; 20 wt. %

(4) Production of the Propylene-based Resin Compositions

The components (A), (B) and (C), prepared above, were mixed with each other for 2 minutes by a Henschel mixer, to prepare the pellets of the propylene-based resin compositions. Their compositions are given in Tables 7. The properties and contents of the components for these resin compositions are given in Tables 4, 5 and 6.

TABLE 4

| | | component (A) | | | | | | | |
|---|---|---|---|---|---|---|---|---|---|
| | | component (a1) | | | | | | component (a3) | |
| | | Ethylene content of the | Content of the | Molecular weight of the | MFR | | | | |
| | Types | a1-1 unit (wt. %) | a1-2 unit (wt. %) | a1-2 unit (Mw) | (g/10 min.) | Number of gels | Content (wt. parts) | MFR (g/10 min.) | Content (wt. parts) |
| EXAMPLE | | | | | | | | | |
| 4 | Pellets (iii) | 39 | 25 | 364,000 | 33 | 25 | 100 | 8 | 4 |
| 5 | Pellets (iii) | 39 | 25 | 364,000 | 33 | 25 | 100 | 8 | 4 |
| 6 | Pellets (iii) | 39 | 25 | 364,000 | 33 | 25 | 100 | 8 | 4 |
| 7 | Pellets (iv) | 39 | 25 | 364,000 | 33 | 25 | 100 | 8 | 4 |
| 8 | Pellets (iii) | 39 | 25 | 364,000 | 33 | 25 | 100 | 8 | 4 |
| 9 | Pellets (iii) | 39 | 25 | 364.000 | 33 | 25 | 100 | 8 | 4 |
| 10 | Pellets (iii) | 39 | 25 | 364,000 | 33 | 25 | 100 | 8 | 4 |
| 11 | Pellets (iii) | 39 | 25 | 364.000 | 33 | 25 | 100 | 8 | 4 |
| COMPARATIVE EXAMPLE | | | | | | | | | |
| 5 | Pellets (iii) | 39 | 25 | 364.000 | 33 | 25 | 100 | 8 | 4 |
| 6 | Pellets (iii) | 39 | 25 | 364.000 | 33 | 25 | 100 | 8 | 4 |
| 7 | Pellets (v) | 55 | 14 | 403,000 | 31 | 28 | 100 | 8 | 4 |
| 8 | Pellets (iii) | 39 | 25 | 364.000 | 33 | 25 | 100 | 8 | 4 |
| 9 | Pellets (iii) | 39 | 25 | 364.000 | 33 | 25 | 100 | 8 | 4 |

| | component (A) | | | | |
|---|---|---|---|---|---|
| | component (a4) | | | Erucic acid amide | Total |
| | Density (g/cm$^3$) | MFR (g/10 min.) | Content (wt. parts) | Content (wt. parts) | content (wt. %) |
| EXAMPLE | | | | | |
| 4 | — | — | 0 | 0 | 60 |
| 5 | — | — | 0 | 0 | 60 |
| 6 | — | — | 0 | 0 | 60 |
| 7 | 0.960 | 7 | 5 | 0.4 | 60 |
| 8 | — | — | 0 | 0 | 60 |
| 9 | — | — | 0 | 0 | 70 |
| 10 | — | — | 0 | 0 | 60 |
| 11 | — | — | 0 | 0 | 60 |
| COMPARATIVE EXAMPLE | | | | | |
| 5 | — | — | 0 | 0 | 60 |
| 6 | — | — | 0 | 0 | 60 |
| 7 | — | — | 0 | 0 | 60 |
| 8 | — | — | 0 | 0 | 60 |
| 9 | — | — | 0 | 0 | 60 |

TABLE 5

| component (B) | | | | | |
|---|---|---|---|---|---|
| component (b1) | | | | | |
| Proportion of the component insoluble in orthodichlorobenzene at below 120° C. in the component insoluble at | Molecular weight of the component insoluble at | MFR | component (b2) Particle | component (b3) | |

TABLE 5-continued

| | Types | below 100° C. (wt. %) | below 100° C. (Mw) | (g/10 min.) | Content (wt. parts) | size (μm) | Content (wt. parts) | MFR (g/10 min.) | Content (wt. parts) |
|---|---|---|---|---|---|---|---|---|---|
| EXAMPLE | | | | | | | | | |
| 4 | Pellets (vi) | 17.5 | 268,000 | 10 | 34 | 4.8 | 60 | 12 | 6 |
| 5 | Pellets (vii) | 23.7 | 348,000 | 3 | 37 | 4.8 | 60 | 12 | 3 |
| 6 | Pellets (viii) | 23.7 | 348,000 | 3 | 34 | 4.8 | 60 | 12 | 6 |
| 7 | Pellets (viii) | 23.7 | 348,000 | 3 | 34 | 4.8 | 60 | 12 | 6 |
| 8 | Pellets (ix) | 23.7 | 348,000 | 3 | 27 | 4.8 | 60 | 12 | 6 |
| 9 | Pellets (x) | 23.7 | 348,000 | 3 | 24 | 4.8 | 70 | 12 | 6 |
| 10 | Pellets (viii) | 23.7 | 348,000 | 3 | 34 | 4.8 | 60 | 12 | 6 |
| 11 | Pellets (xi) | 23.7 | 348,000 | 3 | 39 | 4.8 | 60 | 12 | 1 |
| COMPARATIVE EXAMPLE | | | | | | | | | |
| 5 | Pellets (xii) | 7.4 | 140,000 | 50 | 34 | 4.8 | 60 | 12 | 6 |
| 6 | Pellets (viii) | 22.9 | 412,000 | 0.2 | 34 | 4.8 | 60 | 12 | 6 |
| 7 | Pellets (viii) | 23.7 | 348,000 | 3 | 34 | 4.8 | 60 | 12 | 6 |
| 8 | Pellets (xiv) | 23.7 | 348,000 | 3 | 15 | 4.8 | 60 | 12 | 25 |
| 9 | Pellets (xiv) | 23.7 | 348,000 | 3 | 15 | 4.8 | 60 | 12 | 25 |

| | component (B) | | | | |
|---|---|---|---|---|---|
| | component (b4) | | | Erucic acid amide | (b1) + (b2) |
| | Density (g/cm$^3$) | MFR (g/10 min.) | Content (wt. parts) | Content (wt. parts) | Content (wt. %) |
| EXAMPLE | | | | | |
| 4 | — | — | 0 | 0 | 40 |
| 5 | — | — | 0 | 0 | 40 |
| 6 | — | — | 0 | 0 | 40 |
| 7 | — | — | 0 | 0 | 40 |
| 8 | 0.960 | 7 | 7 | 0.7 | 40 |
| 9 | — | — | 0 | 0 | 30 |
| 10 | — | — | 0 | 0 | 40 |
| 11 | — | — | 0 | 0 | 40 |
| COMPARATIVE EXAMPLE | | | | | |
| 5 | — | — | 0 | 0 | 40 |
| 6 | — | — | 0 | 0 | 40 |
| 7 | — | — | 0 | 0 | 40 |
| 8 | — | — | 0 | 0 | 40 |
| 9 | — | — | 0 | 0 | 40 |

TABLE 6

| | component C | | | | |
|---|---|---|---|---|---|
| | | component (c1) | component (c5) | component (c6) | Total |
| | Types | MFR (g/10 min.) | Content (wt. %) | Content (wt. %) | Content (wt. %) | content (wt. %) |
| EXAMPLE | | | | | |
| 4 | — | — | 0 | 0 | 0 | 0 |
| 5 | — | — | 0 | 0 | 0 | 0 |
| 6 | — | — | 0 | 0 | 0 | 0 |
| 7 | — | — | 0 | 0 | 0 | 0 |
| 8 | — | — | 0 | 0 | 0 | 0 |
| 9 | — | — | 0 | 0 | 0 | 0 |
| 10 | Pellets (i) | 40 | 70 | 10 | 20 | 3 |
| 11 | — | — | 0 | 0 | 0 | 0 |
| COMPARATIVE EXAMPLE | | | | | |
| 5 | — | — | 0 | 0 | 0 | 0 |
| 6 | — | — | 0 | 0 | 0 | 0 |
| 7 | — | — | 0 | 0 | 0 | 0 |

TABLE 6-continued

| | | component C | | | |
|---|---|---|---|---|---|
| | | component (c1) | | component (c5) | component (c6) | Total |
| | Types | MFR (g/10 min.) | Content (wt. %) | Content (wt. %) | Content (wt. %) | content (wt. %) |
| 8 | — | — | 0 | 0 | 0 | 0 |
| 9 | Pellets (i) | 40 | 70 | 10 | 20 | 3 |

(5) Preparation of the Test Pieces

Each type of the pellets was molded by an injection molder (clamping pressure: 170 tons, molding temperature: 210° C.) to prepare the test pieces. The test piece was analyzed to evaluate the bending strength, Izod impact strength, Rockwell hardness, moldability and resistance to scratching of each propylene-based resin composition. The results are given in Table 7.

TABLE 7

| | Proportion | | | | | | Evaluation results | | | | |
|---|---|---|---|---|---|---|---|---|---|---|---|
| | component (A) | | component (B) | | component (C) | | Bending modulus of elasticity (MPa) | Izod impact strength at 23° C. (KJ/m$^2$) | Rockwell hardness | Mold-ability | Resistance to scratching |
| | Types | (wt. %) | Types | (wt. %) | Types | (wt. parts) | | | | | |
| EXAMPLE 4 | Pellets (iii) | 60 | Pellets (vi) | 40 | — | — | 2320 | 29 | 76 | ○ | ○ |
| EXAMPLE 5 | Pellets (iii) | 60 | Pellets (vii) | 40 | — | — | 2430 | 21 | 79 | ○ | ○ |
| EXAMPLE 6 | Pellets (iii) | 60 | Pellets (viii) | 40 | — | — | 2340 | 33 | 74 | ○ | ○ |
| EXAMPLE 7 | Pellets (iv) | 60 | Pellets (viii) | 40 | — | — | 2140 | 40 | 72 | ○ | ⊚ |
| EXAMPLE 8 | Pellets (iii) | 60 | Pellets (ix) | 40 | — | — | 2480 | 38 | 74 | ○ | ⊚ |
| EXAMPLE 9 | Pellets (iii) | 70 | Pellets (x) | 30 | — | — | 2180 | 23 | 73 | ○ | ○ |
| EXAMPLE 10 | Pellets (iii) | 60 | Pellets (viii) | 40 | Pellets (i) | 3 | 2200 | 32 | 72 | ○ | ⊚ |
| EXAMPLE 11 | Pellets (iii) | 60 | Pellets (xi) | 40 | — | — | 2510 | 20 | 80 | ○ | ○ |
| COMPARATIVE EXAMPLE 5 | Pellets (iii) | 60 | Pellets (xii) | 40 | — | — | 2140 | 17 | 77 | ○ | ○ |
| COMPARATIVE EXAMPLE 6 | Pellets (iii) | 60 | Pellets (xiii) | 40 | — | — | 2300 | 35 | 74 | x | ○ |
| COMPARATIVE EXAMPLE 7 | Pellets (v) | 60 | Pellets (viii) | 40 | — | — | 2970 | 12 | 86 | ○ | ○ |
| COMPARATIVE EXAMPLE 8 | Pellets (iii) | 60 | Pellets (xiv) | 40 | — | — | 1750 | 61 | 52 | ○ | x |
| COMPARATIVE EXAMPLE 9 | Pellets (iii) | 60 | Pellets (xiv) | 40 | Pellets (i) | 3 | 1670 | 62 | 49 | ○ | x |

The propylene-based resin composition has good moldability for injection molding, when its components (A) and (B) satisfy the conditions of claim 4 (those prepared in EXAMPLES 4, 5, 6, 9 and 11), although scratched but only to an almost inconspicuous extent, as shown in Table 7. The injection-molded test pieces exhibit high and well-balanced bending modulus of elasticity, Izod impact strength and Rockwell hardness.

The propylene-based resin composition prepared in EXAMPLE 7 contains high-density polyethylene and erucic acid in the component (a4) for the component (A), and satisfies the conditions of claim 4. It has good moldability for injection molding, although scratched but only to an almost inconspicuous extent, as shown in Table 7. The injection-molded test pieces exhibit high and well-balanced bending modulus of elasticity, Izod impact strength and Rockwell hardness. In particular, its excellent Izod impact strength (impact characteristics) and resistance to scratching make the resin composition suitable for instrument panels.

The propylene-based resin composition prepared in EXAMPLE 8 contains high-density polyethylene and erucic acid in the component (b4) for the component (B), and satisfies the conditions of claim 6. It has good moldability for injection molding and shows excellent outer appearances, although scratched but only to an almost inconspicuous extent. The injection-molded test pieces exhibit high and well-balanced bending modulus of elasticity, Izod impact strength and Rockwell hardness. In particular, its excellent Izod impact strength (impact characteristics) and resistance to scratching make the resin composition suitable for instrument panels.

The propylene-based resin composition has good moldability for injection molding, when its components (C) satisfies the conditions of claim 3 (that prepared in EXAMPLE 10), although scratched but only to an almost inconspicuous extent, as shown in Table 7. The injection-molded test pieces exhibit high and well-balanced bending modulus of elasticity, Izod impact strength and Rockwell hardness.

By contrast, the propylene-based resin composition prepared in COMPARATIVE EXAMPLE 5 shows insufficient properties and is inferior to that prepared in EXAMPLE 4 in bending modulus of elasticity and Izod impact strength, wherein the comparative composition fails to satisfy the conditions of claim 1, because its component (b1) for the component (B) has a lower proportion (7.4 wt. %) of the insoluble in orthodichlorobenzene at below 120° C. in the component insoluble at below 100° C., lower weight-average molecular weight of 140,000 for the component insoluble at below 100° C., and higher MFR (230° C., load: 2.16 kg) of 50 g/10 min.

The resin composition prepared in COMPARATIVE EXAMPLE 6 causes formation of surface sinks and short shots on the injection-molded article, although comparable to the one prepared in EXAMPLE 6 in the mechanical properties, wherein its component (b1) for the component (B) fails to satisfy the conditions of claim 1 with a lower MFR of 0.2 g/10 min.

The resin composition prepared in COMPARATIVE EXAMPLE 7 shows insufficient properties, much lower Izod impact strength than that prepared in EXAMPLE 6 and collapsed balance among bending modulus of elasticity, Rockwell hardness and Izod strength, wherein its component (a1) for the component (A) fails to satisfy the conditions of claim 1, because the ethylene/propylene random copolymer component (a1-2 unit) contains ethylene at high 55 wt. % and is contained in the component (a1) at low 14 wt. %. Therefore, it is unsuitable for automobile interiors.

The resin composition prepared in COMPARATIVE EXAMPLE 8 shows insufficient properties, much lower bending modulus of elasticity and Rockwell hardness than those prepared in EXAMPLE 6, collapsed balance among bending modulus of elasticity, Rockwell hardness and Izod strength, and lower resistance to scratching, wherein its component (B) fails to satisfy the conditions of claim 5, because of the higher (b3) component content of 33.3 wt. parts per 100 wt. parts of the totaled components (b1) and (b2). Therefore, the resin composition cannot withstand the service conditions of automobile interiors.

The resin composition prepared in COMPARATIVE EXAMPLE 9 shows insufficient properties, much lower bending modulus of elasticity and Rockwell hardness than those prepared in EXAMPLE 10, collapsed balance among bending modulus of elasticity, Rockwell hardness and Izod strength, and lower resistance to scratching, wherein its component (B) fails to satisfy the conditions of claim 5, because of the higher (b3) component content of 33.3 wt. parts per 100 wt. parts of the totaled components (b1) and (b2). Therefore, the resin composition is unsuitable for automobile interiors.

EXAMPLES 12 TO 14, AND COMPARATIVE EXAMPLES 10 TO 13

(1) Production of the Component (A)

The following component (a1) containing an antioxidant was used for the pellets (vi) and (ix) of the component (A):

Pellets (vi)

Component (a1): Propylene/ethylene block copolymer, composed of 70 wt. % of a crystalline propylene homopolymer component (a1-1 unit) and 30 wt. % of an ethylene/propylene random copolymer component (a1-2 unit) containing 41 wt. % of ethylene and having a weight-average molecular weight of 345,000; and having an MFR (230° C., load: 2.16 kg) of 15 g/10 min. and number of gels of 18 for those having a size of 50 μm or more in the molded article of 25 cm² (area) and 0.5 mm (thickness); 100 wt. parts.

Pellets (ix)

Component (a1): Propylene/ethylene block copolymer, composed of 95 wt. % of a crystalline propylene homopolymer component (a1-1 unit) and 5 wt. % of an ethylene/propylene random copolymer component (a1-2 unit) containing 62 wt. % of ethylene and having a weight-average molecular weight of 786,000; and having an MFR (230° C., load: 2.16 kg) of 0.6 g/10 min. and number of gels of 86 for those having a size of 50 μm or more in the molded article of 25 cm² (area) and 0.5 mm (thickness); 100 wt. parts.

(2) Production of the Component (B)

The following compositions (xv), (xvi), (xviii), (xix) and (xx) were prepared by kneading and granulating the components at a set temperature of 200° C. by an HTM type extruder, and the composition (xvii) was prepared by kneading the components with stirring at around 170 to 180° C. by a super mixer and then granulating the resultant mixture at a set temperature of 200° C. by an extruder.

Composition (xv):

Component (b1): Propylene/ethylene block copolymer, having a density of 0.9092 g/cm³, containing the a1-1 and a1-2 units at 70 and 30 wt. %, and having a component insoluble in orthodichlorobenzene at below 120° C. accounting for 8 wt. % of the component insoluble at below 100° C., when fractionated with orthodichlorobenzene as the solvent, wherein the component insoluble at below 100° C. has a weight-average molecular weight of 253,000 and MFR (230° C., load: 2.16 kg) of 15 g/10 min; 19 wt. parts.

Component (b2): Wollastonite having an average particle size of 9.5 μm and average aspect ratio of 2; 80 wt. parts.

Erucic acid amide; 1 wt. Part

Composition (xvi):

Component (b1): Propylene/ethylene block copolymer, having a density of 0.9092 g/cm³, containing the a1-1 and a1-2 units at 70 and 30 wt. %, and having a component insoluble in orthodichlorobenzene at below 120° C. accounting for 8 wt. % of the component insoluble at below 100° C., when fractionated with orthodichlorobenzene as the solvent, wherein the component insoluble at below 100° C. has a weight-average molecular weight of 253,000 and MFR (230° C., load: 2.16 kg) of 15 g/10 min; 19 wt. parts.

Component (b2): Talc having an average particle size of 5.8 μm and average aspect ratio of 6; 80 wt. parts.

Erucic acid amide; 1 wt. Part

Composition (xvii):

Component (b1): Propylene/ethylene block copolymer, having a density of 0.9092 g/cm³, containing the a1-1 and a1-2 units at 70 and 30 wt. %, and having a component insoluble in orthodichlorobenzene at below 120° C. accounting for 8 wt. % of the component insoluble at below 100° C., when fractionated with orthodichlorobenzene as the solvent, wherein the component insoluble at below 100° C. has a weight-average molecular weight of 253,000 and MFR (230° C., load: 2.16 kg) of 15 g/10 min; 12 wt. parts.

Component (b2): Talc having an average particle size of 5.8 μm and average aspect ratio of 6;80 wt. parts.

Component (b4): High-density polyethylene having an MFR (230° C., load: 2.16 kg) of 22 g/10 min. and density of 0.958 g/cm³; 7 wt. parts Oleic acid amide; 1 wt. Parts Composition (xviii):

Component (b1): Propylene/ethylene block copolymer, having a density of 0.9092 g/cm$^3$, containing the a1-1 and a1-2 units at 70 and 30 wt. %, and having a component insoluble in orthodichlorobenzene at below 120° C. accounting for 8 wt. % of the component insoluble at below 100° C., when fractionated with orthodichlorobenzene as the solvent, wherein the component insoluble at below 100° C. has a weight-average molecular weight of 253,000 and MFR (230° C., load: 2.16 kg) of 15 g/10 min; 19 wt. parts.

Component (b2): Wollastonite having an average particle size of 9.5 μm and aspect ratio of 2;81 wt. parts.

Composition (xix):

Component (b1): Propylene/ethylene block copolymer, having a density of 0.9092 g/cm$^3$, containing the a1-1 and a1-2 units at 70 and 30 wt. %, and having a component insoluble in orthodichlorobenzene at below 120° C. accounting for 8 wt. % of the component insoluble at below 100° C., when fractionated with orthodichlorobenzene as the solvent, wherein the component insoluble at below 100° C. has a weight-average molecular weight of 253,000 and MFR (230° C., load: 2.16 kg) of 15 g/10 min; 19 wt. parts.

Component (b2): Talc having an average particle size of 5.8 μm and average aspect ratio of 6;81 wt. parts.

Composition (xx):

Component (b1): Propylene/ethylene block copolymer, having a density of 0.9092 g/cm$^3$, containing the a1-1 and a1-2 units at 70 and 30 wt. %, and having a component insoluble in orthodichlorobenzene at below 120° C. accounting for 8 wt. % of the component insoluble at below 100° C., when fractionated with orthodichlorobenzene as the solvent, wherein the component insoluble at below 100° C. has a weight-average molecular weight of 253,000 and MFR (230° C., load: 2.16 kg) of 15 g/10 min; 19 wt. parts.

Component (b2): Calcium bicarbonate having an average particle size of 6.3 μm; 81 wt. parts.

(3) Production of the Component (C)

The following components (c1) and (c6) were mixed with each other for 2 minutes by a Henschel mixer, and kneaded/granulated at a set temperature of 200° C. by a biaxial kneader (KOBE STEEL's KCM50) into the pellets (ii) of the component (C):

Pellets (ii):

Component (c1): Low-density polyethylene having an MFR of 30 g/10 min.; 75 wt. %

Component (c6): Pigment containing carbon black and titanium oxide as the major ingredients; 25 wt. %

(4) Production of the Propylene-based Resin Compositions

The component (B) compositions are given in Table 8. The components (A), (B) and (C) (pelletized), prepared above, were mixed with each other for 2 minutes by a Henschel mixer, to prepare the pellets of the propylene-based resin compositions. Their compositions are given in Tables 9.

TABLE 8

| Types | component (B) | | | | |
|---|---|---|---|---|---|
| | component (b1) (wt. parts) | component (b2) (wt. parts) | component (b4) (wt. parts) | Erucic acid amide (wt. parts) | Oleic acid amide (wt. parts) |
| Pellets (xv) | 19 | 80 | — | 1 | — |
| Pellets (xvi) | 19 | 80 | — | 1 | — |
| Pellets (xvii) | 12 | 80 | 7 | — | 1 |
| Pellets (xviii) | 19 | 81 | — | — | — |
| Pellets (xiv) | 19 | 81 | — | — | — |
| Pellets (xx) | 19 | 81 | — | — | — |

(5) Evaluation of the Propylene-based Resin Compositions

1. Resistance to Scratching

The injection-molded sheet (embossed), 120 mm square and 3 mm thick, was scratched at the surface center by a steel needle, pressed against the surface at a load of 600 g and moved at 30 mm/second. The scratches were visually observed to evaluate resistance of each test piece to scratching by the following standards:

A: Scratches rarely observed, or slightly observed but to an inconspicuous extent B: Scratches observed to a relatively inconspicuous extent C: Scratches observed to a conspicuous extent, because they are sufficiently deep or the surface is whitened.

The scratching resistance test was conducted under severer conditions than was the one earlier described for testing the resin compositions prepared in EXAMPLES 4 to 11 and COMPARATIVE EXAMPLES 5 to 9. The grade C means that the molded article of the resin composition is difficult to use under the commercial conditions.

2. Moldability

The sheet, 100 by 360 mm and 2.5 mm thick, was prepared by an injection molder (NIIGATA ENGINEERING's NN350).

The sheet was evaluated by the following two-grade system by fluidity and outer appearances as the molded article: Good: The mold is smoothly filled with the resin composition to give the molded article of commercially acceptable outer appearances Not good: The mold cannot be filled partly, and the molded article will cause practical problems because of conspicuous flow or ring marks.

3. Rigidity: Bending Modulus of Elasticity

This property was determined at 23° C. in accordance with JIS-K7203. It provides a measure of heat resistance.

4. Izod Impact Strength

This property was determined at 23° C. in accordance with JIS-K7110 for the notched test piece. The evaluation results are given in Table 9.

TABLE 9

| | component (A) | | component (B) | | Content of the component (C), wt. parts per 100 wt. parts of the totaled components (A) and (B) | | Evaluation results | | | |
|---|---|---|---|---|---|---|---|---|---|---|
| | Types | (wt. %) | Types | (wt. %) | Types | (wt. parts) | Resistance to scratching | Mold-ability | Bending modulus of elasticity (MPa) | Izod impact strength (KJ/m²) |
| EXAMPLE | | | | | | | | | | |
| 12 | Pellets (vi) | 70 | Pellets (xv) | 30 | Pellets (ii) | 2 | B | good | 2190 | 20 |
| 13 | Pellets (vi) | 70 | Pellets (xvi) | 30 | Pellets (ii) | 2 | B | good | 2410 | 36 |
| 14 | Pellets (vi) | 70 | Pellets (xvii) | 30 | Pellets (ii) | 2 | A | good | 2380 | 45 |
| COMPARATIVE EXAMPLE | | | | | | | | | | |
| 10 | Pellets (vi) | 70 | Pellets (xviii) | 30 | Pellets (ii) | 2 | C | good | 2280 | 16 |
| 11 | Pellets (vi) | 70 | Pellets (xiv) | 30 | Pellets (ii) | 2 | C | good | 2430 | 34 |
| 12 | Pellets (vi) | 70 | Pellets (xx) | 30 | Pellets (ii) | 2 | C | good | 1610 | 21 |
| 13 | Pellets (ix) | 70 | Pellets (xix) | 30 | Pellets (ii) | 2 | C | not good | — | — |

The propylene-based resin composition has good moldability for injection molding and also good resistance to scratching, because it is rarely scratched, or scratched to an inconspicuous or relatively inconspicuous extent, when its components (A) and (B) satisfy the conditions of claim 6 or 7 (those prepared in EXAMPLES 12 to 14). as shown in Table 9. The injection-molded test pieces exhibit high and well-balanced bending modulus of elasticity, and Izod impact strength.

The propylene-based resin composition prepared in COMPARATIVE EXAMPLE 10 containing no fatty acid amide or its derivative in the component (B) has insufficient properties, inferior to that prepared in EXAMPLE 12 containing erucic acid in resistance to scratching.

The propylene-based resin composition prepared in COMPARATIVE EXAMPLE 11 containing no fatty acid amide or its derivative or polyethylene in the component (B) has insufficient properties, inferior to that prepared in EXAMPLE 13 containing erucic acid in resistance to scratching.

The propylene-based resin composition prepared in COMPARATIVE EXAMPLE 12 containing no fatty acid amide or its derivative or polyethylene but containing heavy calcium carbonate in the component (B) has insufficient properties, inferior to those prepared in EXAMPLES 12 and 13 in resistance to scratching and bending modulus of elasticity, and cannot withstand the commercial service conditions.

The propylene-based resin composition prepared in COMPARATIVE EXAMPLE 13 is inferior to that prepared in EXAMPLE 13 in resistance to scratching and moldability (graded "not good"), and will cause practical problems, wherein the comparative composition fails to satisfy the conditions of claim 1, because its component (a1) for the component (A) has a higher crystalline propylene homopolymer component (a1-1 unit) content of 95 wt. %, lower ethylene/propylene random copolymer (a1-2 unit) content of 5 wt. % and lower MFR of 0.6 g/10 min.

INDUSTRIAL FIELD OF APPLICATION

The propylene-based resin composition of the present invention is excellent in rigidity, bending characteristics and impact resistance, well-balanced in properties, and also excellent in resistance to scratching and in moldability. Therefore, it has sufficiently practical properties as the material for molded parts for various industrial purposes, including automobile parts (e.g., bumper, instrument panel and garnish), and home electronic appliance parts (e.g., TV set case).

What is claimed is:

1. A propylene-based resin composition produced by mixing the following components (A) and (B);
   (A) propylene-based resin composed of the following components (a1), (a2) and (a3): 90 to 40 wt. %
      (a1): propylene/ethylene block copolymer, composed of 60 to 83 wt. % of a crystalline propylene homopolymer component (a1-1 unit) and 17 to 40 wt. % of an ethylene/propylene random copolymer component (a1-2 unit) containing 30 to 52 wt. % of ethylene and having a weight-average molecular weight of 230,000 to 600,000; and having a melt flow rate (230° C., load: 2.16 kg) of 15 to 150 g/10 min. and number of gels of 100 or less for those having a size of 50 $\mu$m or more in a molded article of 25 cm² (area) and 0.5 mm (thickness); 100 wt. parts,
      (a2): talc having an average particle size of 0.5 to 15 $\mu$m; 0 to 200 wt. parts.
      (a3): ethylene/$\alpha$-olefin copolymer rubber, containing 20 to 50 wt. % of $\alpha$-olefin of 3 to 8 carbon atoms and having a melt flow rate (230° C., load: 2.16 kg) of 0.3 to 100 g/10 min; 0 to 20 wt. parts, and
   (B): propylene-based resin material composed of the following components (b1) and (b2); 10 to 60 wt. %:
      (b1): propylene homopolymer or propylene/ethylene block copolymer, having a component insoluble in orthodichlorobenzene at below 120° C. accounting for 8 wt. % or more of the component insoluble at below 100° C., when fractionated with orthodichlorobenzene as the solvent, wherein the component insoluble at below 100° C. has a weight-average molecular weight of 200,000 or more and melt flow rate (230° C., load: 2.16 kg) of 0.3 to 70 g/10 min; 15 to 80 wt. parts, and
      (b2): talc or wollastonite having an average particle size of 0.5 to 15 $\mu$m; 20 to 85 wt. parts.

2. A propylene-based resin composition produced by mixing the following components (A) and (B):

(A): propylene-based resin material composed of the following components (a1), (a2) and (a3); 90 to 40 wt. %:
  (a1): propylene/ethylene block copolymer, composed of 60 to 83 wt. % of crystalline propylene homopolymer component (a1-1 unit) and 17 to 40 wt. % of ethylene/propylene random copolymer component (a1-2 unit) containing 30 to 52 wt. % of ethylene and having a weight-average molecular weight of 230,000 to 600,000; and having a melt flow rate (230° C., load: 2.16 kg) of 20 to 150 g/10 min. and number of gels of 100 or less for those having a size of 50 mm or more in the molded article of 25 cm² (area) and 0.5 mm (thickness); 100 wt. parts,
  (a2): talc having an average particle size of 0.5 to 15 μm; 0 to 200 wt. parts,
  (a3): ethylene/α-olefin copolymer rubber containing 20 to 50 wt. % of α-olefin of 3 to 8 carbon atoms and having a melt flow rate (230° C., load: 2.16 kg) of 0.3 to 15 g/10 min; 0 to 10 wt. parts, and
(B): propylene-based resin material composed of the following components (b1) and (b2); 10 to 60 wt. %:
  (b1): homopolypropylene or propylene/ethylene block copolymer, having a component insoluble in orthodichlorobenzene at below 120° C. accounting for 10 wt. % or more of the component insoluble at below 100° C., when fractionated with orthodichlorobenzene as the solvent, wherein the component insoluble at below 100° C. has a weight-average molecular weight of 200,000 or more and melt flow rate (230° C., load: 2.16 kg) of 0.3 to 20 g/10 min; 100 wt. parts, and
  (b2): talc having an average particle size of 0.5 to 15 μm; 0 to 200 wt. parts.

3. A propylene-based resin composition, composed of 100 wt. parts of the totaled components (A) and (B) of claim 1 incorporated with 10 wt. parts or less of the following component (C), and produced by mixing these components:
  (C): propylene-based colorant material, composed of the following components (c1), (c3), (c4), (c5) and (c6):
    (c1): propylene homopolymer, propylene/ethylene block copolymer, propylene/ethylene random copolymer, polyethylene or ethylene-based rubber, having a melt flow rate (230° C., load: 2.16 kg) of 0.3 to 200 g/10 min.; 20 to 99.9 wt. %,
    (c3): ethylene/α-olefin copolymer rubber containing 20 to 50 wt. % of α-olefin of 3 to 8 carbon atoms and having a melt flow rate (230° C., load: 2.16 kg) of 0.3 to 100 g/10 min; 0 to 90 wt.
    (c4): polyethylene having a density of 0.920 g/cm³ or more and melt flow rate (190° C., load: 2.16 kg) of 1 to 100 g/10 min; 0 to 90 wt. %,
    (c5): fatty acid amide; 0 to 30 wt. %, and
    (c6): pigment; 0.1 to 80 wt. %.

4. The propylene-based resin composition according to claim 1 or 3, wherein 100 wt. parts of said component (a1) for said component (A) is incorporated with 20 wt. parts or less of the following component (a4):
  (a4): polyethylene having a density of 0.920 g/cm³ or more and melt flow rate (190° C., load: 2.16 kg) of 1 to 100 g/10 min.

5. The propylene-based resin composition according to claim 1 or 3, wherein 100 wt. parts of said components (b1) and (b2) for said component (B) is incorporated with 30 wt. parts or less of the following component (b3):
  (b3): ethylene/α-olefin copolymer rubber containing 20 to 50 wt-% of α-olefin of 3 to 8 carbon atoms and having a melt flow rate (230° C., load: 2.16 kg) of 0.3 to 100 g/10 min.

6. The propylene-based resin composition according to claim 1 or 3, wherein 100 wt. parts of said components (b1) and (b2) for said component (B) is incorporated with 30 wt. parts or less of the following component (b4):
  (b4): polyethylene having a density of 0.920 g/cm³ or more and melt flow rate (190° C., load: 2.16 kg) of 1 to 100 g/10 min.

7. The propylene-based resin composition according to claim 1 or 3, wherein 100 wt. parts of said components (b1) and (b2) for said component (B) is incorporated with 0.1 to 9 wt. parts of a fatty acid amide.

8. The propolyne-based resin composition according to claim 1 or 3, wherein 100 wt. parts of said components (b1) and (b2) for said component (B) is incorporated with 0.1 to 5 wt. parts of a higher fatty acid or its metallic salt.

9. A method for molding the propylene-based resin composition of one of claims 1 to 3 by injection molding or press injection molding.

10. An automobile part produced by the method of claim 9.

* * * * *